United States Patent [19]
Mrotek et al.

[11] Patent Number: 5,582,936
[45] Date of Patent: Dec. 10, 1996

[54] LEAD-ACID BATTERIES WITH OPTIMUM CURRENT COLLECTION AT GRID LUGS

[75] Inventors: Edward N. Mrotek, Grafton; Wen-Hong Kao, Brown Deer, both of Wis.

[73] Assignee: Globe-Union, Inc., Milwaukee, Wis.

[21] Appl. No.: 340,583

[22] Filed: Nov. 16, 1994

[51] Int. Cl.$^6$ .................................................. H01M 4/74
[52] U.S. Cl. ............................................ 429/241; 429/211
[58] Field of Search ...................................... 429/211, 241

[56] References Cited

U.S. PATENT DOCUMENTS

| | | | |
|---|---|---|---|
| 3,923,545 | 12/1975 | Margulies et al. | 429/211 |
| 3,989,539 | 11/1976 | Grabb | 429/211 |
| 4,118,553 | 10/1978 | Buckethal et al. | 429/234 |
| 4,221,852 | 9/1980 | Qureshi | 429/211 |
| 4,477,546 | 10/1984 | Wheeler et al. | 429/211 |
| 4,528,255 | 7/1985 | Hayes et al. | 429/241 |
| 4,555,459 | 11/1985 | Anderson et al. | 429/211 |
| 5,308,719 | 5/1994 | Mrotek et al. | 429/160 |

FOREIGN PATENT DOCUMENTS 2127614  1/1986  United Kingdom.

OTHER PUBLICATIONS

Perez, *The Complete Battery Book*, TAB Books, Inc. p. 3, 1985 (no month).

*Primary Examiner*—Prince Willis, Jr.
*Assistant Examiner*—Carol Chaney
*Attorney, Agent, or Firm*—Harness, Dickey & Pierce, P.L.C.

[57] ABSTRACT

A grid for a lead acid battery plate with a conductive frame having a top element and a bottom frame element, with conductive wires extending from the bottom element to the top element which includes an enlarged section beneath a current collection lug and being of a size and shape so as to optimize the current flow to the lug. Other features disclosed are the conductive wire shape and spacing so that the amount of conductive material such as lead is reduced where it has been predetermined that the current flow is minimal. In addition, the grid is designed to have equidistant potential points relative to the lug to optimize current flow. The advantage of such a grid is that it maximizes performance of the battery while keeping its weight at a minimum.

18 Claims, 5 Drawing Sheets

LEAD-ACID BATTERIES WITH OPTIMUM CURRENT COLLECTION AT GRID LUGS

BACKGROUND OF THE INVENTION

1. Field of the Invention

The present invention relates generally to the field of lead acid batteries and, more particularly, to a battery grid structure having a grid lug. Still more specifically, the present invention relates positive and negative battery plates made from such grid structures. In a further refinement of the present invention, the invention relates to grid structures which facilitate current collection of the lug, especially for positive battery plates. This permits the elimination of individual battery plates, yielding lighter weight batteries or similar weight having dramatically improved performance characteristics.

2. Description of Prior Battery Systems

Lead acid batteries typically comprise a series of thin, flat, generally rectangular grids for carrying currents through the battery. The grids also serve as a substrate for supporting electrochemically active material or "paste" deposited thereon during manufacture to form battery plates. The paste typically comprises a mixture of lead oxide and a dilute acid solution, for example sulfuric acid. The paste composition is determined by power requirements, cost and the battery environment, as is known in the art.

It is also known that groupings of individual battery plates may be assembled, interleaved with separator material, and cast together to form plate stacks. The latter are then assembled in a container to form a final battery. A typical example would be an automobile battery of the 12-volt variety where, six individual stacks are placed into a plastic container having six compartments. Obviously, to permit current to follow throughout the battery, it is necessary to join the cast-on straps of one stack with the appropriate cast-on strap of the adjacent stack. Moreover, it is necessary to provide terminal electrodes which will extend through the casing to permit electrical contact with the vehicle's electrical system.

After the battery plates are fully assembled, they are formed, i.e. charged, and the battery is placed into service. An important characteristic of batteries is called "cold cranking power," i.e., the amount of power which can be generated per unit of time. Further references will be made to cold cranking power in later sections of this specification.

In more recent years, the grid has been formed in a screen-like pattern, having a matrix or a honeycomb pattern of alternating metal strips and open spaces. A porous chemical paste is applied to the grids and the lead frame members at the top, bottom and sides. The paste forms "paste pellets" within the open spaces of the grid. After the paste is cured, the electrodes are assembled into a battery casing, whereupon the housing is filled with aqueous electrolyte solution and sealed. In current systems, the lugs have been symmetrically offset from the centerline of the battery by amounts ranging from ½ inch to much larger amounts, and in many designs, the lugs of either the positive or negative battery plates are located near an upper corner of the plate. During assembly, it is necessary to couple together the positive lugs of the battery plates and to couple together the lugs of the negative plates. This is typically accomplished using cast-on lead straps formed by taking assembled battery plate stacks, inverting them, and dipping the lugs into molten lead contained within a mold. In the most common batteries, such cast-on straps have an upwardly extending end position, as will be explained more fully when the drawings are described later herein.

In U.S. Pat. No. 3,923,545, issued Dec. 2, 1975 to Margulies, et al., a "Grid Structure For High Rate Lead/Acid Battery" is described. In this device, the grid is constructed of more numerous vertical elements than horizontal elements and a collector tab is provided offset from the center of the top. A tapered portion is provided on the top frame element. In addition, at least two current-carrying grid elements are tapered in width and expand from the bottom of the plate toward the top thereof, the purpose of which is stated to be to maximize mechanical support while minimizing the resistive paths in regions of highest current density. In the background section of this patent, reference is made to an earlier patent wherein the tops of several "bars" nearest the terminal are thickened to provide ample current-carrying capacity in the region of the terminal lug.

Another earlier grid design is shown in U.S. Pat. No. 4,118,553, issued Oct. 3, 1978 to Buckenthal, et al. and entitled "Composite Battery Plate Grid And Method Of Manufacturing." This patent, owned by the assignee of the present invention, describes a composite grid including a plastic support having conductive members cast in a pattern extending generally radially from the collector lug, which is located near a corner of the grid. To attach the radial conductive members, the bottom of the lug extends laterally on both sides of the lug.

Still another grid construction in G.B. Pat. No. 2127614 issued Jan. 29, 1986 to Sonnenschein Accumulatoren and entitled "Electrode Grid for Storage Batteries" discloses a plurality of fine wires of a honeycomb structure with many equal elongated polygonal rhombs which is combined with a tapered herringbone central conductor. It is stated that a lower ohmic resistance is achieved within the grid plate and the amount of lead is reduced with this design.

Yet a different arrangement for grid elements is disclosed in Anderson, et al. U.S. Pat. No. 4,555,459, issued Nov. 26, 1985 and entitled "Battery Grids." The horizontal and angled wires defining this grid form a plurality of parallelogram spaces of substantially equal size, whereby paste pellets may be more uniformly created in the pasting operation. The lug is located on the top frame generally adjacent a corner, and in one embodiment, a tapered wire element is arranged vertically with the taper extending from bottom to top to divide the grid into two rectangular sections, each of which contains the parallelogram spaces.

A more recent grid arrangement with a center lug is shown in U.S. Pat. No. 5,308,719, issued May 3, 1994 to Mrotek et al., and entitled Lead Acid Batteries Containing Center Plates and High Performance Cast-On Straps. This patent, owned by the assignee of the present invention, discloses a grid construction in which the lug is formed with an expanded symmetrical base above the top of the frame member of the grid to provide a larger amount of conductive material on the sides of the lug. The purpose of the expanded base is for improving the collection of current collection of the lug. To maintain the weight of the grid at the same weight as a grid with a conventional lug, the conduction material on the grid wires is reduced by an offsetting amount.

While it is apparent from the foregoing description that numerous plate and grid designs have been developed in the lead acid battery art, improvements still need to be made in the design and manufacture of such batteries. One of the most significant improvements needed is a grid structure which reduces the weight associated with this type of energy source without deviating from the standard battery design with the conventional offset-from-the-center lug, but also a design which still can be used with unconventional lug positions on the top frame.

Furthermore, it is always advantageous to look for ways to maximize the efficiency of the grid conductors in transferring current from the sites where electrochemical reactions are occurring to the collector lugs as well as reducing the lead and, hence, the weight of the grid, on those conductors which are not the primary current conductors. Further, it is highly advantageous to use the optimum amount of lead in the grid where the current flow is the greatest.

Any lead acid battery which combines the various advantages discussed in the previous paragraphs would represent a substantial advance in the art.

SUMMARY OF THE INVENTION

The present invention comprises a lead acid battery with a novel grid structure for either positive or negative plates having an enlarged top frame member whose width is predetermined as a function of current density carried by the top frame member to a current collection lug and increases from each side frame member to a maximum in the area of the lug. Since the larger width in the top frame member increases the amount of lead in the top frame member, a corresponding amount of lead is reduced in other parts of the grid in which current density is lower and, especially, those parts in which current is minimal or does not flow due to another path to the collection lug. The reduction in the amount of lead is predetermined so as to not affect the current carrying capacity of those parts of the grid.

In this regard, another feature of the present invention is having conduction wires of the grid vary in size as a function of the current they will conduct. This permits the potential between points within the grid from side to side and the center point of the lug to be substantial equal and thus optimizes the current flow within the grid. The points within the grid form essentially an arc across the width of the grid from the center point of the lug. Also, the size of the wires are optimized for the amount of lead necessary to carry the current of a particular wire, thereby optimizing the weight of the wire. Accordingly, the largest wire, which carries the greatest current is the area of the lug, with wires on either side of this wire being preferably progressively smaller in size.

A further feature of the present invention is to decrease the size and to increase the lateral dimension between grid wires adjacent the side frames when the current is carried by the side frame members rather than the side grid wires. Since the primary function of these wires is for structural support, the amount of lead for current conduction purposes can be minimal to further offset the increased lead in the top frame member.

Other features of the invention and other ways in which the present invention provides the features will become apparent to one skilled in the art after reading the following detailed description of a particularly preferred embodiment.

DETAILED DESCRIPTION OF THE DRAWINGS

DETAILED DESCRIPTION OF THE MOST PREFERRED EMBODIMENT

Before proceeding to the detailed description of the preferred and alternative embodiments of the present invention, several comments would be appropriate with regard to the applicability and scope thereof.

First, several terms will be used throughout the remainder of the specification which should be defined in this introduction. The term "grid" will be used to refer to the open spaced network of wires with surrounding frame elements and a lug, substantially all of which are used to conduct current from electrochemical reactions which take place during the formation of charge and discharge of the battery. The "top frame element" has a length corresponding to the width of the grid and a thickness or "width" which is a dimension extending from lug side to the under side of the top frame element. "Width" is also used to define the size of the wires within the grid. As will be discussed later, there are some parts of the grid whose primary function is for structural support and not for current conduction. The term "plate" as used herein will refer to the grids and the positive or negative combinations of active paste material which take the form of paste pellets within the open spaces of the grids. The term "stack" will refer to a combination of a plurality of positive and negative plates which are assembled for insertion into a battery compartment, such as a cell of a multi-stack battery. "Cast-on-strap" is a term as used herein to mean the strap of conductive material used to combine and electrically interconnect the lugs of like polarity within a stack. "Terminal electrodes" are the positive and negative electrodes which are typically found on the top or front compartments of a battery. Such terminal electrodes typically include portions which may extend either through the top of the battery or the front of the battery, depending upon battery design.

With regard to materials, they do not, in and of themselves, form a part of the present invention. In that regard, materials previously used and well known in the art for preparing battery grids may be used in the present invention, including the preferred lead-antimony alloys. As for active paste materials, these also can be typical paste materials which are described in numerous patents and texts on lead acid batteries. The cast-on-straps are typically lead and, in connection with the present invention, it should be mentioned that they are usually added to the battery stacks in a single operation which involves the assembly of a plurality of stacks into the number needed for the final battery, the grasping of them by equipment which will allow the inversion of the plurality of stacks and insertion of the lugs into molds containing liquid lead. Following cooling, the stack is removed, at which time the various straps are solid and attached to the lugs.

Figure 6:
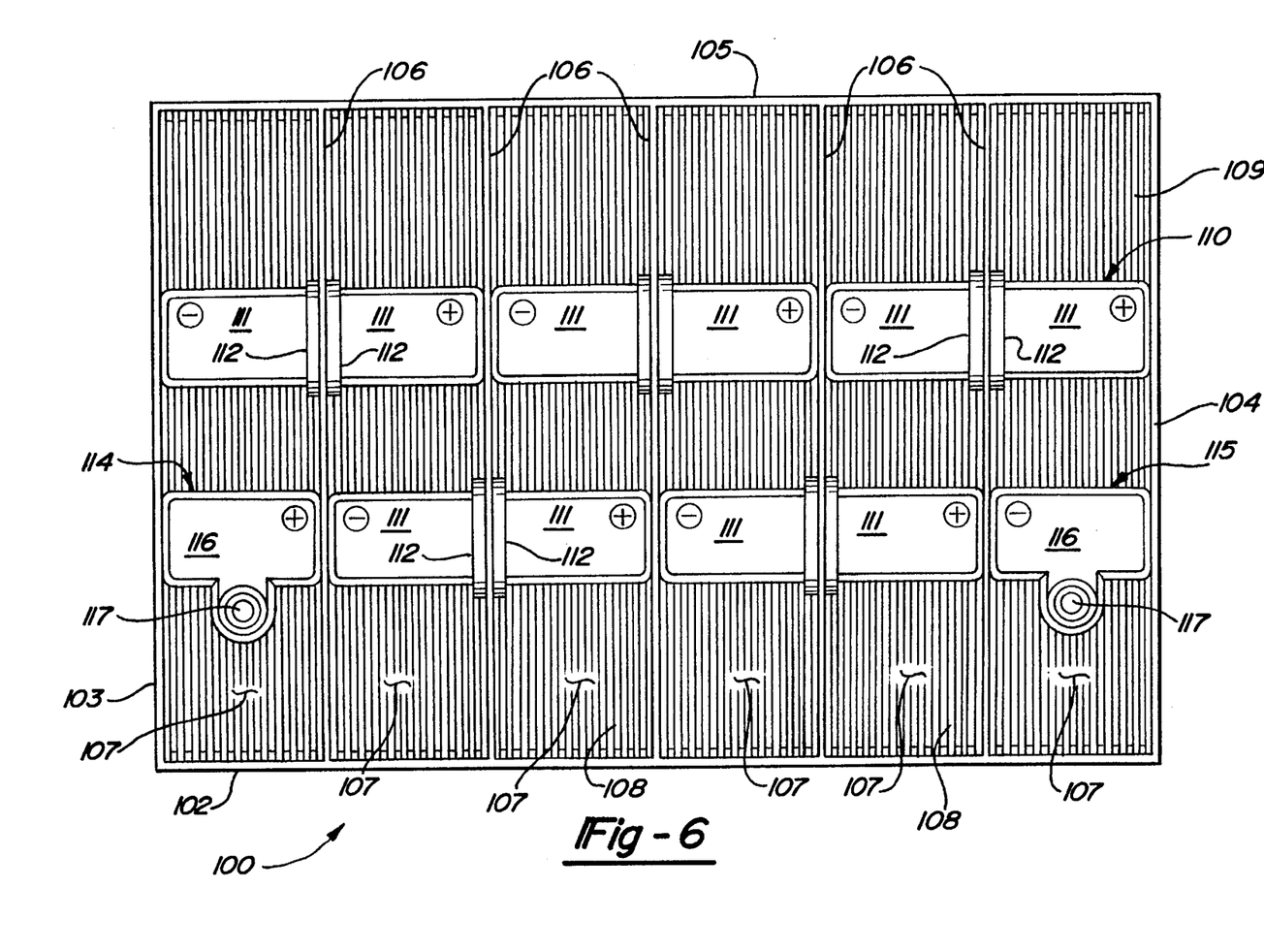
FIG. 6 is a top view of a six compartment battery with the battery grids of FIGS. 1 and 2 being connected to positive and negative terminal electrodes.

In connection with the casting material, it also can be selected from materials well known in the art, typically having an outer container as will be shown in FIG. 6, a plurality of cell dividers, and a cover (not shown) which can include several other normal components for lead acid batteries, including vent caps, explosion attenuation devices, and the like. While reference may be made to certain materials in this specification, the invention relates primarily to novel designs for grids to maximize performance while maintaining or even reducing weight and the batteries in which they are incorporated. The novelty of the invention is not in the materials.

Before leaving this background section of the specification, it also should be mentioned that the specific size of the various components can be varied widely utilizing the principles of the present invention. The illustrations provided herein relate to automotive application, wherein groups of 15–16 plates are used in each of six stacks for producing a standard automotive 12-volt battery. It will be obvious to those skilled in the art after reading this specification that the size of the individuals grids, the number of plates in any particular stack, and the number of stacks used to construct a battery may vary widely depending upon the desired end use.

Figure 1:
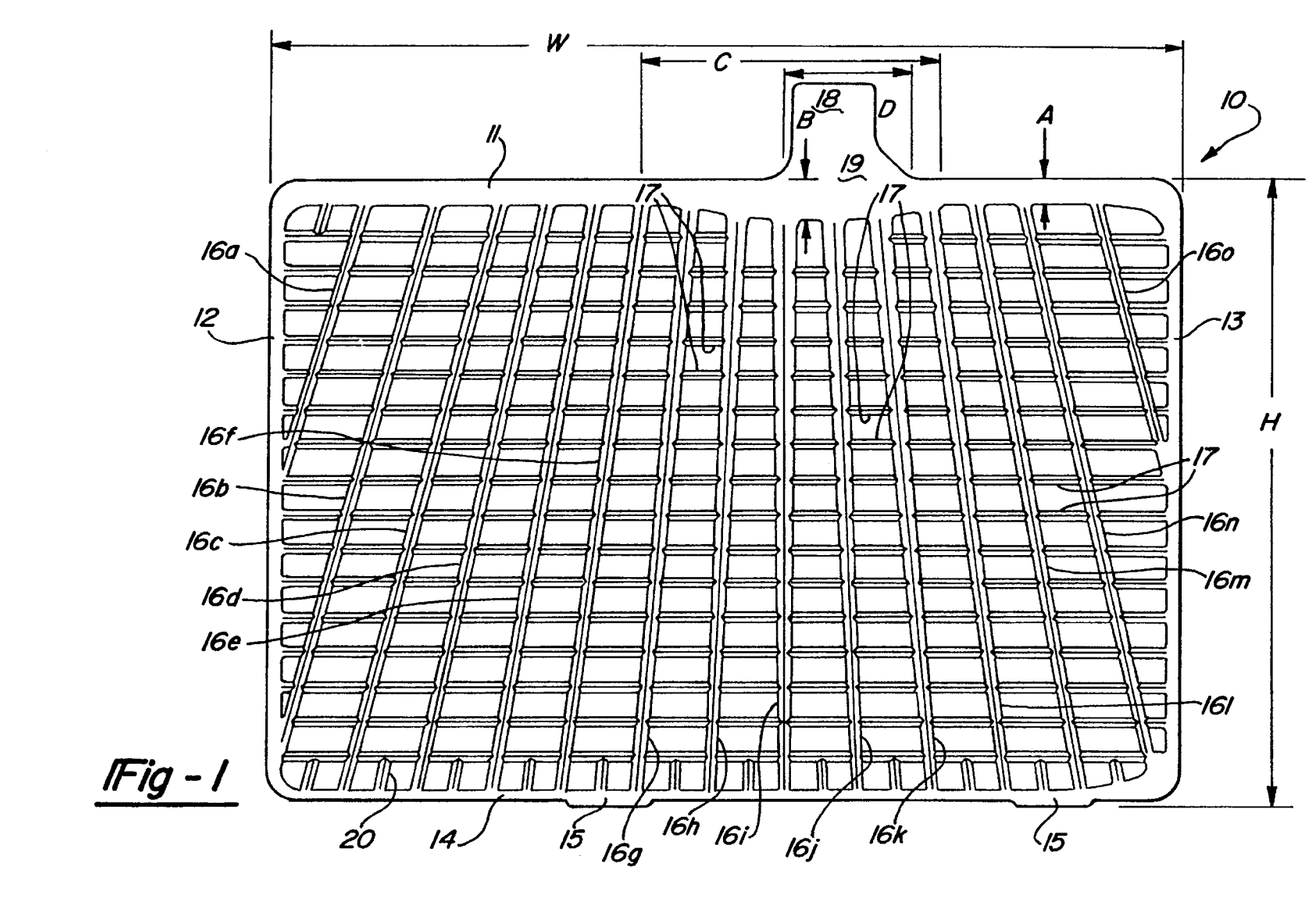
FIG. 1 is a front elevation view of a center offset lug positive battery grid prepared according to the most preferred form of the present invention.

The most preferred embodiment of the present invention will be described in detail, followed by a detailed description of alternative embodiments. FIG. 1 shows a generally rectangular battery grid 10 for, herein, a positive battery plate. The grid 10 comprises a top frame element 11, first and second side frame elements 12 and 13, and a bottom frame element 14. Herein, the bottom frame element is formed with a pair of downwardly extending feet 15 for spacing the remainder of the grid away from the bottom of the battery container, as is well known in the battery art. Within the interior of the grid 10 is a plurality of wires 16a–16o extending from the bottom frame element 14 to the top frame element 11 and, in accordance with the present invention, increasing in width from the bottom to the top or having a tapered shape so as to optimize the current carrying capacity of the wires with the increasing current being generated from the bottom to the top. The width and spacing of the wires between side elements 12 and 13 are predetermined so that there are substantially equal potential points across the width of the grid. Further, the reduction in the size of the wire, where the current being generated is low, reduces the amount of the lead needed and lessens the weight of the battery. Preferably, the wires 16a–16h and 16j–16o extend radially toward wire 16i which is parallel with side elements 12 and 13. To assist in supporting the electrochemical paste and permit the formation of paste pellets, the grid 10 also includes horizontal wires 17 which herein are equally spaced apart and are parallel to the top and bottom frame elements 11 and 14.

As a collection point for the current being generated, a current collection lug 18 is integral with the top frame element 11 and, in accordance with the present invention, the element 11 includes an enlarged conductive section 19 beneath the current collection lug 18 and of a predetermined shape to optimize current conduction to the lug 18. In the present instance with the lug 18 offset from the center, the enlarged section 19 increases in size from top to bottom starting at wire 16f and reaches a maximum in top-to-bottom width at wire 16j in the area beneath the lug 18. On the other side of the wire 16i, the enlarged portion 19 of the top frame 11 starts at wire 16l and increases in top-to-bottom width to the maximum thickness at wire 16j. These increases in size and the shape of the enlarged section 19 correspond to the increased current to be carried to the current collection point of the lug 18 and optimize the efficiency of the current carried by the grid 10. Although the amount of lead used in the top frame element is greater, the overall lead content in the grid 10 remains essentially the same since the amount of the lead used in the parts of the grid with lower current, such as the tapered wires in the bottom portion of the grid, is reduced due to the wires that portion being of a lesser width. This supports the feature of the invention of substantially equal potential points across the width of the grid in that these points from the center of the lug take the form of essentially an arc to optimize the current flow in the grid.

In addition, in accordance with another feature of the present invention, wires 16a and 16o function to carry minimal current since their respective thicker side frame elements 12 and 13 perform that function. The amount of lead in these wires 16a and 16o is relatively small, being only sufficient in amount to provide structural support. These wires also are spaced further apart from their respective adjacent wires. The amount of lead in the bottom portion of those grid wires also can be limited to structural support as can the short wires 20.

To optimize the size of the enlarged section of the top frame element for current carrying capacity while minimizing the size and hence the amount of lead added to the top frame, ratios have been established between the enlarged section maximum width and the grid height, the top frame width, the grid width, and the lug width. These dimensions are identified by arrows and labelled as H for grid height, W for grid width, A for top frame minimum width, B for enlarged section maximum width, C for enlarged section length, and D lug width. The table below sets forth the preferred ranges for those ratios.

| RATIO PAIR | RATIO RANGE |
| --- | --- |
| Enlarged Section/Frame Height | 0.05 to 0.10 |
| Enlarged Section/Top Frame Width | 1.20 to 7.00 |
| Enlarged Section/Frame Width | 0.30 to 0.75 |
| Enlarged Section/Lug Width | 2.00 to 6.00 |

These ratios were derived from a number of grid designs of different height, width, top frame dimensions and with enlarged sections of different sizes and shapes.

Figure 2:
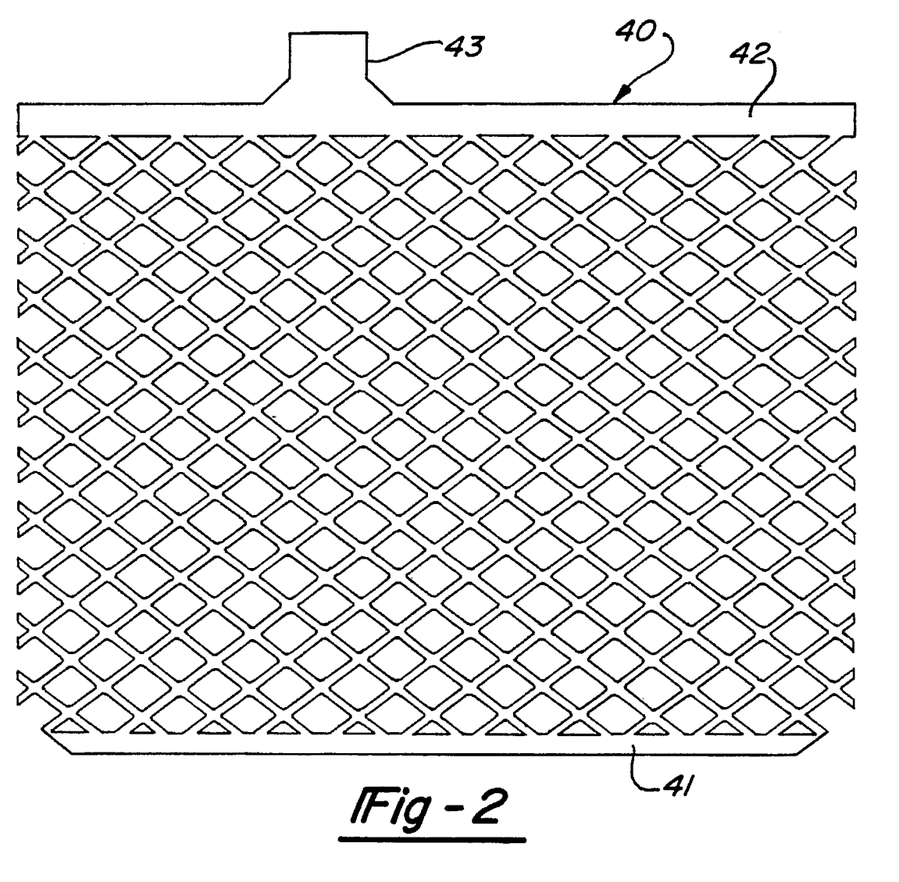
FIG. 2 is a front elevation view of a center offset lug conventional negative battery grid which is paired with the positive grid of FIG. 1.

Although the grid for the negative battery plate can be similar in structure as the above-described grid 10 for the positive battery plate, the grid for the negative battery plate does not have the same current carrying requirements as the grid 10 because, during operation of the battery, the negative plate is substantially more conductive, such as much as 100X, than the positive plate. This is due to the paste pellets being in metal form in the grid for the negative plate whereas the paste pellets in grid for the positive plate are metal oxide, herein lead oxide. Preferably then, the grid 40 for the negative battery plate is an expanded metal design of a diamond pattern, which is well known in the art, with a bottom frame element 41 and a top frame element 42 which is integral with a lug 43. The amount of metal, herein lead, used in fabricating the grid 40 is substantially less than the grid 10 of the present invention since the paste pellets, being in metallic form during the operation of the battery, assist in the conduction of the current.

Figure 3:
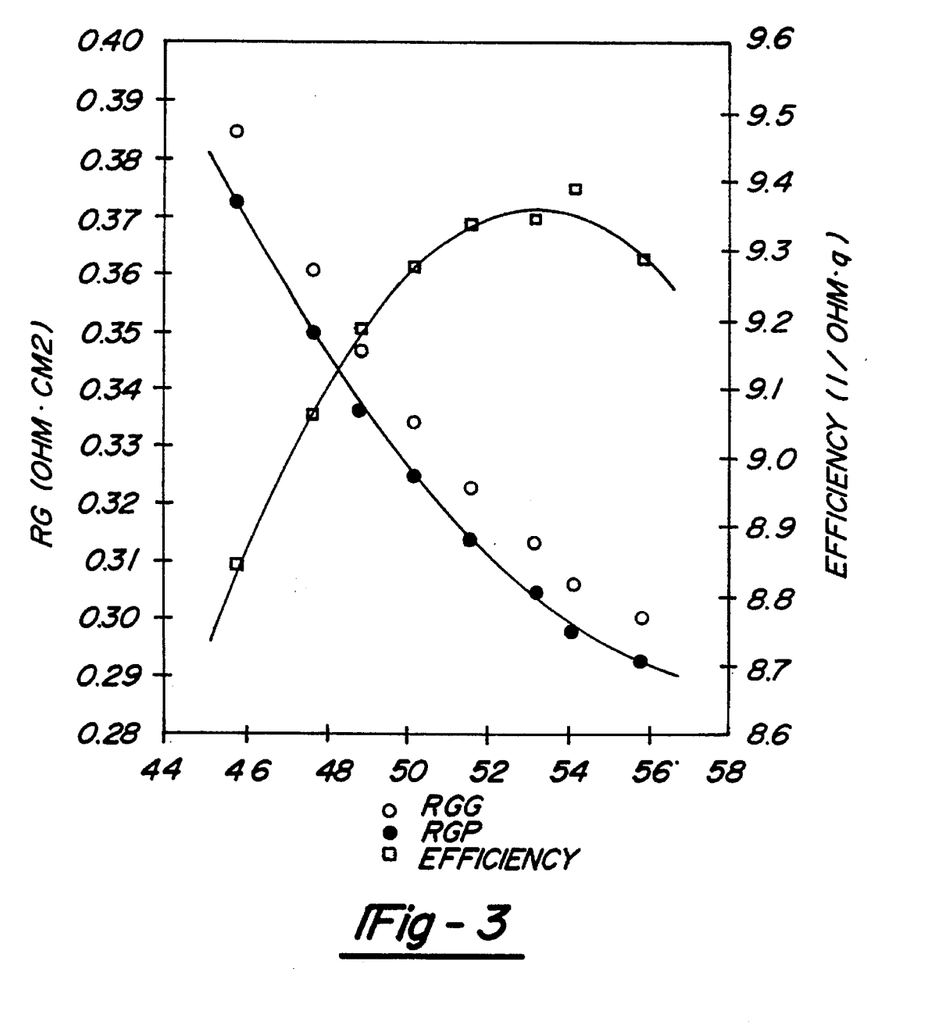
FIG. 3 is a graph in which weight of grid by increased lead content is plotted in conjunction with the corresponding conduction efficiency of the grid.

To show the relationship between grid weight, herein based on lead content, grid resistivity (1/current conductivity), and efficiency, FIG. 3 is a plot of grid weight in grams, grid resistivity in ohms—$cm^2$, and efficiency in 1/ohm—grams relative to the embodiment of FIG. 1. This plot reveals that with increased weight of the grid due to increased lead content, the resistivity of the grid (R6) and the resistivity of the grid to plate (R6P) decrease or, conversely, the current conduction or conductivity increases. However, the plot also reveals that the grid with the greatest weight of 56 grams and lowest grid resistivity of 0.29 ohm-cm$^2$ is not the most efficient grid, but rather a grid with weight of 53 grams and a resistivity of 0.305 ohm-cm$^2$ is the optimum for the grid design of FIG. 1.

Figure 4:
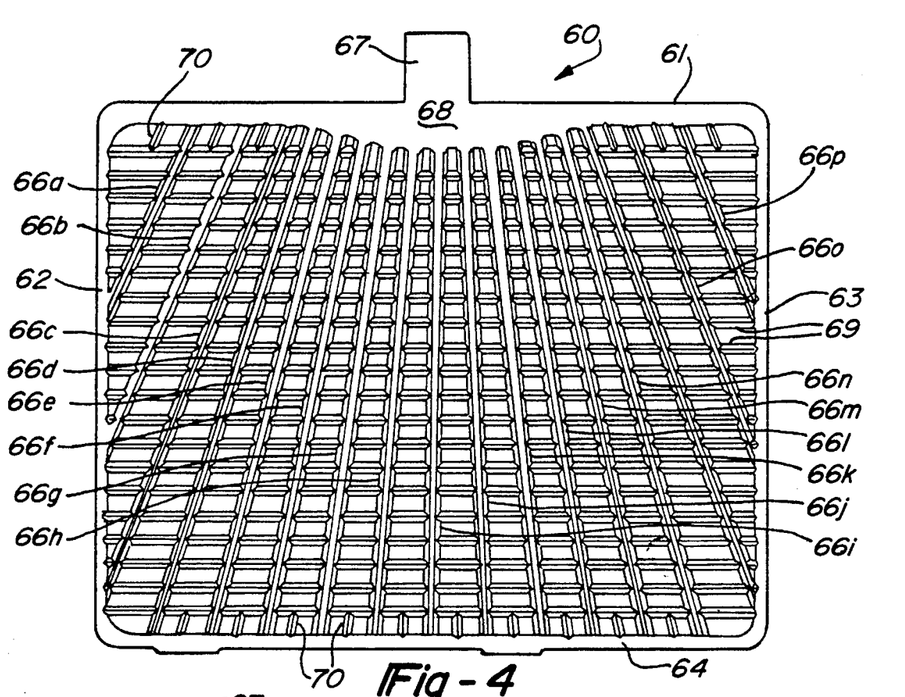
FIG. 4 is a partial front elevation view of a battery grid of another alternate embodiment of the present invention in which the lug is position in the center of the top frame member.

If it is desired to have the current collection lug in the center of the top frame element, an alternative embodiment of the present invention is shown in FIG. 4 with such a lug configuration. In this embodiment, a grid 60 for a positive battery plate comprises a top frame element 61, a first and second side frame elements 62 and 63, and a bottom frame element 64. Within the interior of the grid 60 is a plurality of wires 66a–66
extending from the bottom frame element 64 or side frame element 62 and 63 to the top frame element 61 and increasing in width from the bottom to the top so as to optimize the current carrying capacity of the wires with the current being generated increasing from the bottom to the top. In this embodiment, wires 66a–66h and 66i–66q extend radially toward wire 66i which is parallel with side elements 62 and 63 and in the center of a lug 67. Since the current collection lug 67 is in the center of the top frame element 61, the shape of the enlarged portion 68 in this embodiment of the present invention is essentially symmetrically with the greatest top-to-bottom width being in the center of the lug which is where the greatest collection of current results from the converging wires 66. Also, in this embodiment the segment of the arc of the potential points closest to the bottom from element 64 is the segment in the center of the arc. Since the side frame elements are wider than the wires, the wires 66a and 66
adjacent these sides carry minimal current and are formed with minimal lead as are short wires 70. As was the case of the preferred embodiment of FIG. 1, the grid 60 in this embodiment includes wires 69 which herein are equally spaced apart and are parallel to the top and bottom frame elements 61 and 64 to assist in supporting the electrochemical paste and permit the formation of paste pellets.

Figure 5:
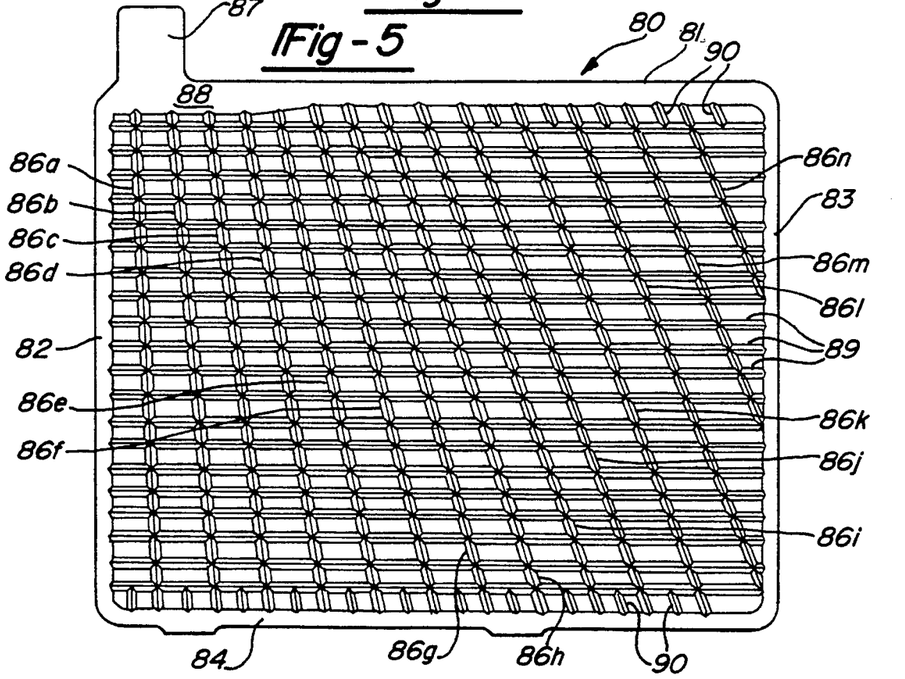
FIG. 5 is a partial front elevation view of a battery grid of alternate embodiment of the present invention in which the lug is positioned adjacent one of the side frame members.

Further, if it is desired to have the current collection lug adjacent either of the side frame elements, an alternative embodiment of the present invention is shown in FIG. 5 with such a lug configuration. In this embodiment, a grid 80 or a positive battery plate comprises a top frame element 81, a first and second side frame elements 82 and 83, and a bottom frame element 84. Within the interior of the grid 80 is a plurality of wires 86a–86n extending from the bottom frame element 84 to the top frame element 81 and increasing in width from the bottom to the top so as to optimize the current carrying capacity of the wires with the current be generated increasing from the bottom to the top. In this embodiment, wires 86a–86n extend radially towards side frame elements 82 and toward a current collection lug 87 adjacent the side element 82. Since the current collection lug 87 is adjacent the side element 82, the shape of the enlarged portion 88 of the present invention has its greatest top-to-bottom width adjacent the side frame element 82 which is where the greatest collection of current results from the converging wires 86. In this embodiment, the segment of the arc of potential points closest to the bottom frame element 84 is the segment on the same side as the lug. Also, the wires 86k, 86l, 86m, and 86n are spaced further apart and contain less metal, herein lead, since current being generated at this distance from the current collection lug 87 is less and the wider side frame element 83 and top frame element 81 carries a share of the current being generated in this area of the grid 80. Again, in this embodiment as was the case in the preferred embodiment of FIG. 1 and the alternative embodiment of FIG. 4, the grid 80 includes wires 89 which herein are equally spaced apart and parallel to the top and bottom frame elements 81 and 84 to assist in supporting the electrochemical paste and permit the formation of paste pellets. Short wires 90 also are included for structural support.

With the embodiments of the grid for the positive battery plate as shown in FIGS. 4 and 5, the grid for the negative battery plate can be the same grid as shown in FIG. 2 as long as the lug is offset from the lug of FIG. 4 and the lug of FIG. 5. Accordingly, the grid for the negative battery plate is an expanded metal design of a diamond pattern which is well known in the art.

Since the preferred grid 10 (FIG. 1) for the positive battery plate is the same size and with the lug in the same position as the grid currently being used in a conventional battery, the fabricated battery 100 as shown in FIG. 6 looks externally the same as the conventional type. In FIG. 6, individual plates are not shown in detail and the cover and its associated components have been removed from the drawing to facilitate explanation of the components. The battery 100 includes a compartment having a front wall 102, end walls 103 and 104, rear wall 105 and a bottom wall (not shown). Located between end walls 103 and 104 are five cell partitions 106, resulting in the formation of six compartments 107, as typically would be present in a twelve volt automotive battery. A plate stack 108 is located in each compartment 107, each stack 108 being comprised of a plurality of positive and negative plates, the separator material placed therebetween. In the illustration, the positive plate lugs are arranged offset from the center line of the battery toward the front wall 102. The negative plate lugs are located offset from the center line of the battery towards the rear wall 105, except for stack 109, in an end compartment adjacent end wall 104 where the negative plate lugs are located offset from the center line of the battery toward the front wall 102 of the battery compartment. This reversal is provided so as to permit the terminal electrode to be located on the same side of the battery compartment.

FIG. 6 also shows conventional cast-on-straps 110 each of which include a rectangular, elongated body portion 111 of a length sufficient to electrically couple each lug in of battery plate stack 108 and an upwardly extending leg 112 having a rounded top. The body portions 111 are reversed in orientation for the positive and negative lugs so that the upwardly extending legs 112 are at opposite ends of the stacks. These straps 110 fit snugly against the dividing walls of the battery casing so that the upwardly extending leg 112 of one stack connecting positive plate lugs can be electrically fused through the casing wall to upwardly extending leg 112 of the strap coupling the negative plate lugs in the adjoining cell. FIG. 6 also illustrates the cast-on-straps 114 and 115 connecting the positive and negative terminal electrodes, respectively. These straps 114, 115 each include a body portion 116 coupling the respective lugs in the end compartments and a post 117 formed therewith to protrude through the cover (not shown). It will be recognized that a variety of terminal arrangements are possible using the preferred and alternative grid embodiments of the present invention, including top, side or corner configurations known in the art.

While the present invention has been described in connection with certain preferred and alternative embodiments, it is not to be limited thereby but it is to be limited solely by the claims which follows.

What is claimed is:

1. A grid of a lead-acid battery, comprising:

a generally rectangular, electrically conductive grid body having opposed top and bottom frame elements and opposed side frame elements, said top frame element with a width and having an enlarged conductive section extending toward the bottom frame element of a thickness or width such that the ratio in thickness or width of the enlarged conductive section to the width of the top frame element ranges from about 2.0 to about 6.0;

a plurality of spaced apart conductive wires defining a grid pattern within said grid body and at least a portion of said wires extending from the bottom to the top frame element for carrying current being generated, said wires are formed with a varying thickness which increases from bottom to top and said wires, moving from the enlarged conductive section toward said side frame elements, decreasing in cross-sectional area based on the current capacity required due to increased current flow; and a current collection lug extending above the top frame element and positioned over the widest portion of said enlarged conductive section of the top frame element so as to optimize the current flow from said wires extending from the bottom to top frame elements to the current collection lug and give the grid an efficiency expressed in 1/ohm-g of greater than 9.1.

2. The grid of claim 1 wherein said wires extending from the bottom to the top frame elements are non-parallel and generally extend toward the direction of the current collection lug and at least a portion of the wires converge into said enlarged conductive segment.

3. The grid of claim 1 wherein said wires extending from the bottom to the top frame element have substantially equal current carrying capacity to the lug, thereby optimizing the current flow in the grid.

4. The grid of claim 1 wherein said wires having minimal current flow are spaced further apart than those said wires carrying current and are formed with only sufficient conductive material for structural support.

5. The grid of claim 3 wherein wires or portions of said wires having no or minimal current flow are formed with less conductive material than those said wires or portions of those said wires having current flow.

6. The grid of claim 1 wherein the current collection lug and the enlarged conduction section are offset from the center of the top frame element.

7. The grid of claim 1 wherein the current collection lug and the enlarged conduction section are directly in the center of the top frame element.

8. The grid of claim 1 wherein the current collection lug and enlarged conduction section are adjacent one of the side frame elements.

9. The grid of claim 1 wherein the ratio in width of the enlarged section to the width of the frame ranges from about 0.30 to about 0.75.

10. A lead-acid battery comprising a plurality of cellular compartments formed by end walls and partitions, each of compartments housing a plurality of positive and negative battery plates including a grid body and electrolytic paste and having separators disposed therebetween, said battery plates having generally rectangular, electrically conductive grid body with opposed top and bottom frame elements, and a current collection lug extending above the top frame element, said grid body having a plurality of spaced apart conductive wires defining a grid pattern within the body, at least the grid of the positive plate having an enlarged section beneath the top frame element so as to optimize the current flow from the grid to the current collection lug and give the grid an efficiency expressed in 1/ohm-g of greater than 9.1 and said wires are formed with a varying thickness which increases from bottom to top and said wires, moving from the enlarged conductive section toward said side frame elements, decreasing in cross-sectional area based on the current capacity required due to increased current flow.

11. The battery of claim 10 wherein said wires extending from the bottom to the top frame elements are non-parallel and generally extend toward the direction of the current collection lug and at least a portion of the wires converge into said enlarged conductive segment.

12. The battery of claim 10 wherein said wires extending from the bottom to the top frame element have substantially equal current carrying capacity to the lug, thereby optimizing the current flow in the grid.

13. The battery of claim 10 wherein said wires having minimal current flow are spaced further apart than those said wires carrying current and are formed with only sufficient conductive material for structural support.

14. The battery of claim 12 wherein wires or portions of said wires having no or minimal current flow are formed with less conductive material than those said wires or portions of those said wires having current flow.

15. The battery of claim 10 wherein the current collection lug and the enlarged conduction section are offset from the center of the top frame element.

16. The battery of claim 10 wherein the current collection lug and the enlarged conduction section are directly in the center of the top frame element.

17. The battery of claim 10 wherein the current collection lug and enlarged conduction section are adjacent one of the side frame elements.

18. The battery of claim 10 wherein the ratio in width of the enlarged section to the width of the frame ranges from about 0.30 to about 0.75.

* * * * *